United States Patent
Lawrence et al.

(10) Patent No.: US 12,435,018 B2
(45) Date of Patent: Oct. 7, 2025

(54) PROCESSES AND SYSTEMS FOR UPGRADING A HYDROCARBON

(71) Applicant: ExxonMobil Chemical Patents Inc., Baytown, TX (US)

(72) Inventors: Selma S. Lawrence, Houston, TX (US); Mark A. Nierode, Kingwood, TX (US); Rodney S. Smith, Edinburgh (GB)

(73) Assignee: ExxonMobil Chemical Patents Inc., Baytown, TX (US)

( * ) Notice: Subject to any disclaimer, the term of this patent is extended or adjusted under 35 U.S.C. 154(b) by 111 days.

(21) Appl. No.: 18/268,463

(22) PCT Filed: Jan. 3, 2022

(86) PCT No.: PCT/US2022/011018
§ 371 (c)(1),
(2) Date: Jun. 20, 2023

(87) PCT Pub. No.: WO2022/150263
PCT Pub. Date: Jul. 14, 2022

(65) Prior Publication Data
US 2024/0034703 A1 Feb. 1, 2024

Related U.S. Application Data

(60) Provisional application No. 63/135,300, filed on Jan. 8, 2021.

(30) Foreign Application Priority Data

Mar. 8, 2021 (EP) .................................... 21161156

(51) Int. Cl.
C07C 7/09 (2006.01)
C07C 7/00 (2006.01)
(Continued)

(52) U.S. Cl.
CPC .................. *C07C 7/09* (2013.01); *C07C 7/12* (2013.01); *C10G 55/04* (2013.01); *C10G 2400/20* (2013.01)

(58) Field of Classification Search
None
See application file for complete search history.

(56) References Cited

U.S. PATENT DOCUMENTS

| 4,720,293 A | 1/1988 | Rowles et al. |
| 4,895,584 A | 1/1990 | Buck et al. |

(Continued)

FOREIGN PATENT DOCUMENTS

| CA | 2344488 C | 10/2003 |
| DE | 4217611 A1 | 12/1993 |

(Continued)

OTHER PUBLICATIONS

Recovery of Olefins from Refinery Offgases, Margaret M. Shreehan, PTQ 4Q 1998, 9 pages.

(Continued)

*Primary Examiner* — Tam M Nguyen

(57) ABSTRACT

Processes are provided for removing contaminants from a refinery gas. Such process can include recovering a process gas comprising ethylene and propylene from a steam cracker effluent recovered from a stream cracker in a steam cracker facility. A refinery gas can be recovered from a refinery facility. The process gas can be compressed in a plurality of compressor stages. A pressure of the refinery gas can be determined. A compressor stage in the plurality of compressor stages can be selected for introducing the refinery gas using the determined pressure of the refinery gas. The refinery gas can be introduced into the selected compressor stage to produce a combined gas that can include the process gas and the refinery gas. At least a portion of one or more (Continued)

impurities can be removed from the combined gas in the steam cracker facility to produce an upgraded combined gas.

25 Claims, 3 Drawing Sheets

(51) Int. Cl.
  *C07C 7/12* (2006.01)
  *C10G 55/04* (2006.01)

(56) References Cited

U.S. PATENT DOCUMENTS

| | | | |
|---|---|---|---|
| 5,546,764 A | 8/1996 | Mehra | |
| 5,634,354 A | 6/1997 | Howard et al. | |
| 6,278,035 B1 | 8/2001 | Key et al. | |
| 7,316,127 B2 | 1/2008 | Huebel et al. | |
| 8,586,815 B2 | 11/2013 | Rudolf et al. | |
| 9,394,490 B2 * | 7/2016 | Trucko | C10G 21/08 |
| 10,052,581 B1 | 8/2018 | Montalbano et al. | |
| 2010/0048972 A1 | 2/2010 | Sun et al. | |
| 2012/0053383 A1 * | 3/2012 | Malaty | C10G 70/046 |
| | | | 585/650 |
| 2014/0323791 A1 * | 10/2014 | Das | C07C 7/12 |
| | | | 585/809 |
| 2015/0353439 A1 * | 12/2015 | Van Westrenen | C07C 4/04 |
| | | | 585/302 |
| 2018/0170839 A1 | 6/2018 | Kurukchi et al. | |
| 2019/0352569 A1 | 11/2019 | Oprins et al. | |
| 2023/0151283 A1 * | 5/2023 | Nierode | C10G 69/06 |
| | | | 208/130 |

FOREIGN PATENT DOCUMENTS

| | | | |
|---|---|---|---|
| EP | 1 555 308 | 7/2005 | |
| WO | 2012/027554 | 3/2012 | |
| WO | 2012/099677 | 7/2012 | |
| WO | 2018/142343 | 8/2018 | |
| WO | 2019/239353 | 12/2019 | |
| WO | 2020/252228 | 12/2020 | |
| WO | WO 2020252228 A1 * | 12/2020 | C10G 1/10 |

OTHER PUBLICATIONS

A "Look-Back" at EPC Contributions to "Dealing with Ethylene Plant Contaminants" Ed Mohundro, Ethylene Plant Feedstock Impurities Session, 2013 EPC Meeting, 30 pages.
Top 5 Contaminants in Ethylene Production Unit Feedstocks, Thomas Pickett, 28 pages, 2004.
Sheng-Yi Chuang et al., Contaminants Key to Refinery Offgas Treatment Unit Design, Oil & Gas Journal, Sep. 15, 2008, 15 pages.
Refinery Off-Gas Recovery Technology, Technip Energies, Jim Middleton et al., 8 pages, 2017.

* cited by examiner

PROCESSES AND SYSTEMS FOR UPGRADING A HYDROCARBON

CROSS-REFERENCE TO RELATED APPLICATIONS

This application is a US national phase application of PCT Application Serial No. PCT/US2022/011018 having a filing date of Jan. 3, 2022, which claims priority to and the benefit of U.S. Provisional Application No. 63/135,300 having a filing date of Jan. 8, 2021, and claims priority to EP 21161156.1 having a filing date of Mar. 8, 2021, the disclosures of all of which are incorporated herein by reference in their entireties.

FIELD

Embodiments disclosed herein generally relate to processes and systems for upgrading a hydrocarbon. More particularly, such processes and systems relate to removing contaminants from a refinery gas.

BACKGROUND

Refinery unit off-gas streams or simply refinery gases can be produced in a number of refineries that upgrade hydrocarbons via one or more processes such as fluidized catalytic cracking, coking, hydrocracking, hydrotreating, isomerization, reforming, hydrocarbon saturation, and hydrocarbon unsaturation, to name a few. The refinery gases often contain valuable hydrocarbons such as ethane, propane, and/or other hydrocarbons.

In addition to the valuable hydrocarbons the refinery gas also typically contains a large amount of one or more contaminants such as molecular nitrogen, nitrogen oxides, mercaptans, carbonyl sulfide, ammonia, and/or molecular oxygen. The quantity of valuable hydrocarbons relative to the contaminants that need to be separated therefrom, however, make it prohibitive from an economic standpoint to recover the hydrocarbons. As such, the refinery gases are conventionally sent to flare, a combustor, or otherwise disposed.

There is a need, therefore, for improved processes and systems for recovering hydrocarbons from refinery gases.

SUMMARY

Processes and systems for removing contaminants from a refinery gas are provided. In some embodiments, the process can include recovering a process gas that can include ethylene and propylene from a steam cracker effluent recovered from a stream cracker in a steam cracker facility. The process can also include recovering a refinery gas from a refinery facility. The process gas can be compressed in a plurality of compressor stages. A pressure of the refinery gas can be determined. A compressor stage in the plurality of compressor stages for introducing the refinery gas can be selected using the determined pressure of the refinery gas. The refinery gas can be introduced into the selected compressor stage to produce a combined gas that can include the process gas and the refinery gas. At least a portion of one or more impurities can be removed from the combined gas in the steam cracker facility to produce an upgraded combined gas lean in the one or more impurities.

In other embodiments, the process for removing contaminants from a refinery gas can include recovering a refinery gas from a refinery facility and pre-treating the refinery gas to remove at least a portion of one or more first impurities that can include at least one of: molecular nitrogen, a nitrogen oxide, and molecular oxygen to produce a pre-treated refinery gas. The process can also include recovering a process gas that can include ethylene and propylene from a steam cracker effluent in a steam cracker facility. The process gas can be compressed in a plurality of compressor stages to produce a compressed process gas. A pressure, a composition, or a pressure and a composition of the pre-treated refinery gas can be determined. A location in the steam cracker facility can be selected for combining at least a portion of the pre-treated refinery gas with the compressed process gas using the pressure, the composition, or the pressure and the composition of the pre-treated refinery gas. At least a portion of the pre-treated refinery gas can be added to the process gas at the selected location to produce a combined gas that can include the process gas and the refinery gas. At least a portion of one or more second impurities can be removed from the combined gas in the steam cracker facility to produce an upgraded combined gas lean in the one or more second impurities.

In other embodiments, the process for removing contaminants from a refinery gas, can include recovering a refinery gas that can include one or more $C_1$-$C_5$ hydrocarbons and carbonyl sulfide from a refinery facility. The refinery gas can be contacted with a sorbent under conditions sufficient to cause at least a portion of the carbonyl sulfide to sorb onto the sorbent to produce a pre-treated refinery gas lean in carbonyl sulfide and a sorbent rich in carbonyl sulfide. The sorbent rich in carbonyl sulfide can be contacted with a regenerating gas to produce a regenerated sorbent and a desorb effluent comprising a sulfur-based contaminant. The desorb effluent can be introduced into a pyrolysis zone of a steam cracker in a steam cracker facility to produce a steam cracker effluent. A process gas that can include one or more $C_1$-$C_4$ hydrocarbons can be recovered from the steam cracker effluent. In some embodiments, the process gas can further include $C_{5+}$ hydrocarbons. The process gas can be compressed in a plurality of compressor stages to produce a compressed process gas. The pre-treated refinery gas and the compressed process gas can be combined to produce a combined gas that can include the pre-treated refinery gas and the process gas. One or more impurities can be removed from the combined gas in the steam cracker facility to produce an upgraded combined gas lean in the one or more impurities.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
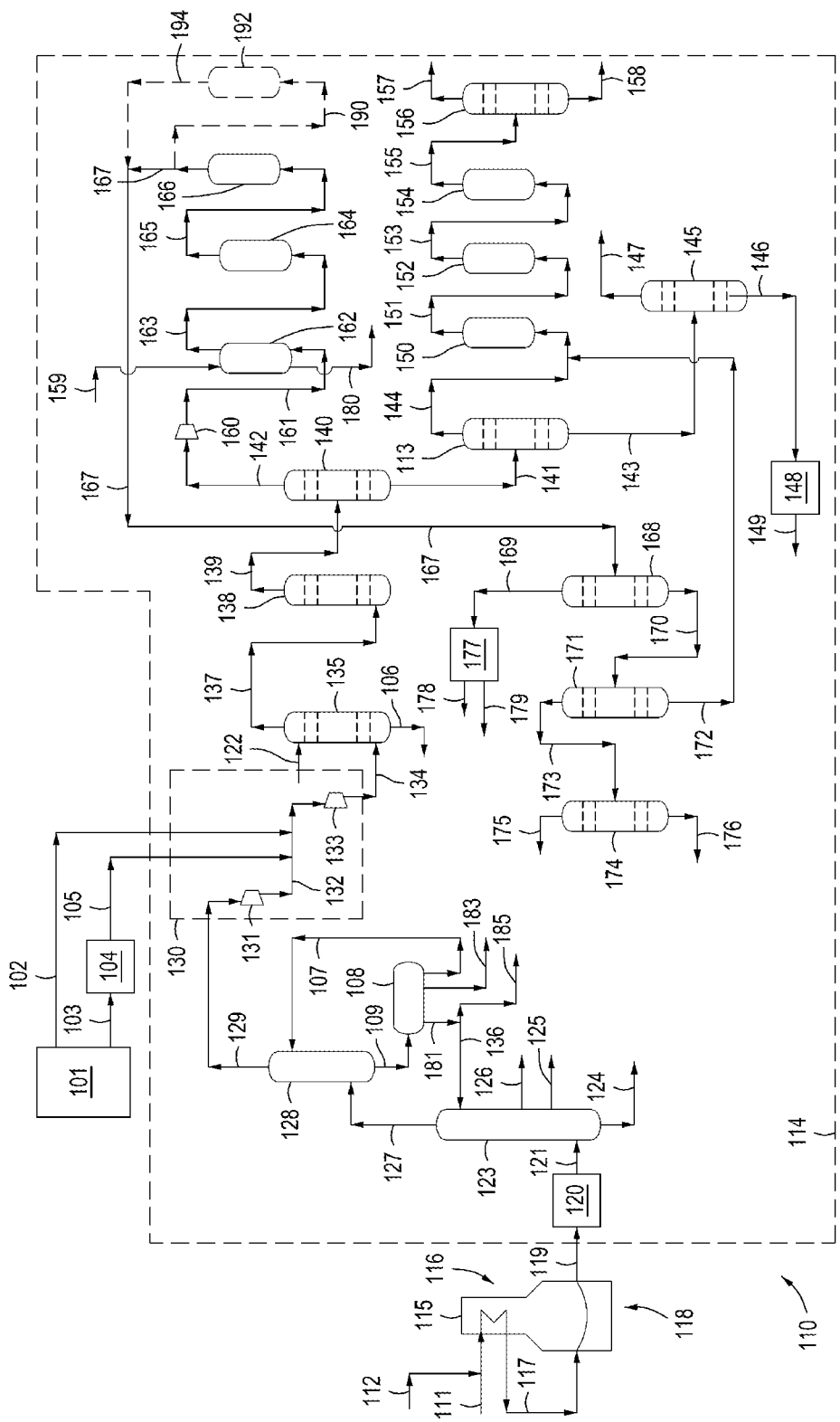
FIG. 1 depicts a schematic of an illustrative system for removing one or more contaminants from a refinery gas and/or a pre-treated refinery gas recovered from a refinery facility, according to one or more embodiments described.

It is to be understood that the following disclosure describes several exemplary embodiments for implementing different features, structures, and/or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the Figures. Moreover, the exemplary embodiments presented below can be combined in any combination of ways, i.e., any element from one exemplary embodiment can be used in any other exemplary embodiment, without departing from the scope of the disclosure.

The indefinite article "a" or "an", as used herein, means "at least one" unless specified to the contrary or the context clearly indicates otherwise. Thus, embodiments using "a separator" include embodiments where one or two or more separators are used, unless specified to the contrary or the context clearly indicates that only one separator is used. Likewise, embodiments using "a separation stage" include embodiments where one or two or more separation stages are used, unless specified to the contrary.

Definitions

The terms "refinery gas" is a refinery off-gas, and refers to a gaseous stream recovered from a petroleum and/or petrochemical facility that upgrades one or more hydrocarbons via any upgrading process except for steam cracking. Such facilities that can produce the refinery gas include, but are not limited to, hydrocarbon upgrading processes that include fluidized catalytic cracking, coking, hydrocracking, hydrotreating, isomerization, reforming, decoking, hydrocarbon combustion, hydrocarbon distillation, hydrocarbon unsaturation, and hydrocarbon saturation processes. The term "process gas" refers to a gaseous stream recovered from a steam cracker effluent in a steam cracker facility.

As used herein, the term "hydrocarbon" means a class of compounds containing hydrogen bound to carbon. The term "$C_n$" hydrocarbon means hydrocarbon having n carbon atom(s) per molecule, where n is a positive integer. The term "$C_{n+}$" hydrocarbon means hydrocarbon having at least n carbon atom(s) per molecule, where n is a positive integer. The term "$C_{n-}$" hydrocarbon means hydrocarbon having no more than n number of carbon atom(s) per molecule, where n is a positive integer. "Hydrocarbon" encompasses (i) saturated hydrocarbon, (ii) unsaturated hydrocarbon, and (iii) mixtures of hydrocarbons, including mixtures of hydrocarbon compounds (saturated and/or unsaturated), including mixtures of hydrocarbon compounds having different values of n.

The term "unsaturate" or "unsaturated hydrocarbon" means a $C_{2+}$ hydrocarbon containing at least one carbon atom directly bound to another carbon atom by a double or triple bond. The term "olefin" means an unsaturated hydrocarbon containing at least one carbon atom directly bound to another carbon atom by a double bond. In other words, an olefin is a compound which contains at least one pair of carbon atoms, where the first and second carbon atoms of the pair are directly linked by a double bond. "Light olefin" means $C_{5-}$ olefinic hydrocarbon.

The term "primarily liquid phase" means a composition of which ≥50 wt. % is in the liquid phase, e.g., ≥75 wt. %, such as ≥90 wt. %. A hydrocarbon feedstock is a primarily liquid-phase hydrocarbon feedstock when ≥50 wt. % of the hydrocarbon feedstock is in the liquid phase at a temperature of 25° C. and a pressure of 1 bar absolute, e.g., ≥75 wt. %, such as ≥90 wt. %.

The term "raw" feedstock, e.g., raw hydrocarbon feedstock, means a primarily liquid-phase feedstock that comprises ≥25 wt. % of crude oil that has not been subjected to prior desalting and/or prior fractionation with reflux, e.g., ≥50 wt. %, such as ≥75 wt. %, or ≥90 wt. %.

The term "crude oil" means a mixture comprising naturally-occurring hydrocarbon of geological origin, where the mixture (i) comprises ≥1 wt. % of resid, e.g., ≥5 wt. %, such as ≥10 wt. %, and (ii) has an API gravity ≤52°, e.g., ≤30°, such as ≤20°, or ≤10°, or ≤8°. The crude oil can be classified by API gravity, e.g., heavy crude oil has an API gravity in the range of from 5° up to (but not including) 22°.

Normal boiling point and normal boiling point ranges can be measured by gas chromatograph distillation according to the methods described in ASTM D-6352-98 or D2887, as extended by extrapolation for materials above 700° C. The term "$T_{50}$" means a temperature, determined according to a boiling point distribution, at which 50 weight percent of a particular sample has reached its boiling point. Likewise, "$T_{90}$," "$T_{95}$," and "$T_{98}$" mean the temperature at which 90, 95, or 98 weight percent of a particular sample has reached its boiling point. Nominal final boiling point means the temperature at which 99.5 weight percent of a particular sample has reached its boiling point.

Certain medium and/or heavy hydrocarbons, e.g., certain raw hydrocarbon feedstocks, such as certain crude oils and crude oil mixtures contain one or more of asphaltenes, precursors of asphaltenes, and particulates. Asphaltenes are described in U.S. Pat. No. 5,871,634. Asphaltene content can be determined using ASTM D6560-17. Asphaltenes in the hydrocarbon can be in the liquid phase (e.g., a miscible liquid phase), and also in a solid and/or semi-solid phase (e.g., as a precipitate). Asphaltenes and asphaltene precursors are typically present in a crude oil's resid portion. "Resid" means an oleaginous mixture, typically contained in or derived from crude oil, the mixture having a normal boiling point range ≥1050° F. (566° C.). Resid can include "non-volatile components", meaning compositions (organic and/or inorganic) having a normal boiling point range ≥590° C. Non-volatile components may be further limited to components with a boiling point of about 760° C. or greater. Non-volatile components may include coke precursors, which are moderately heavy and/or reactive molecules, such as multi-ring aromatic compounds, which can condense from the vapor phase and then form coke under the specified steam cracking conditions. Medium and/or heavy hydrocarbons (particularly the resid portion thereof) may also contain particulates, meaning solids and/or semi-solids in particle form. Particulates may be organic and/or inorganic, and can include coke, ash, sand, precipitated salts, etc. Although precipitated asphaltenes may be solid or semi-solid, precipitated asphaltenes are considered to be in the class of asphaltenes, not in the class of particulates.

Hydrocarbon Upgrading

FIG. 1 depicts a schematic of an illustrative system for removing one or more contaminants from a refinery gas in line 102 and/or a pre-treated refinery gas in line 105 recovered from a refinery facility 101, according to one or more embodiments. The system can include the refinery facility 101 and a steam cracker facility 110. The steam cracker facility can include one or more steam crackers 115 and one or more recovery facilities 114. It has been discovered that the refinery gas in line 102 and/or the pre-treated refinery gas in line 105 can be imported into the steam cracker facility 110 and mixed or otherwise combined with a process gas within the recovery facility 114 to produce a combined gas.

The refinery gas in line 102 and/or the pre-treated refinery gas in line 105 can be or can include, but is not limited to, molecular hydrogen, one or more $C_1$-$C_5$ alkanes, one or more $C_2$-$C_5$ alkenes, and one or more contaminants. In some embodiments, the refinery gas in line 105 can include $C_{5+}$ hydrocarbons, e.g., $C_6$-$C_9$ hydrocarbons. The one or more contaminants or impurities that can be present in the refinery gas can be or can include, but are not limited to, ammonia, methanol, methyl mercaptan, ethyl mercaptan, hydrogen sulfide, carbon monoxide, carbon dioxide, acetaldehydes, carbonyl sulfide (COS), water vapor, molecular nitrogen, one or more nitrogen oxides, molecular oxygen, mercury, arsine, silicon, carbon disulfide, one or more oxygenates, one or more thiophenes, acetylene, or any mixture thereof.

The one or more contaminants in the refinery gas 102 and/or the pre-treated refinery gas in line 105 can be removed from the combined gas in one or more contaminant removal stages within the recovery facility 114. In some embodiments, at least a portion of the refinery gas via line 103 can be introduced into a pre-treatment stage 104 to remove at least a portion of one or more contaminants and produce the pre-treated refinery gas in line 105. In some embodiments, the pre-treatment stage 104 can be or can include, but is not limited to, compression, a water wash tower, an amine wash tower, a caustic wash tower, a dehydrator, mercury removal, a cold box for separation of a tail gas, a DeOx reactor, a carbonyl sulfide removal stage, or any combination thereof, as described in more detail below.

The steam cracker facility 110 can produce a process gas in line 129. The process gas in line 129 can be or can include, but is not limited to, molecular hydrogen, one or more $C_1$-$C_5$ alkanes, one or more $C_2$-$C_5$ alkenes, and one or more contaminants, or a mixture thereof. In some embodiments, the process gas can include $C_{5+}$ hydrocarbons. Production of the process gas in line 129 is described in more detail below. The one or more contaminants or impurities that can be present in the process gas can be or can include, but are not limited to, ammonia, methanol, methyl mercaptan, ethyl mercaptan, hydrogen sulfide, carbon monoxide, carbon dioxide, acetaldehydes, carbonyl sulfide, water vapor, mercury, arsine, silicon, carbon disulfide, molecular nitrogen, one or more nitrogen oxides, one or more oxygenates, one or more thiophenes, acetylene, one or more nitrogen oxides, or any mixture thereof.

The process gas via line 129 can be introduced into a first stage 131 of a multi-stage compressor 130. As shown, the multi-stage compressor includes the first stage 131 and a second stage 133. The multi-stage compressor can include any number of compression stages, such as 2, 3, 4, 5, 6, or more. It should be understood that the multi-stage compressor 130 can also include one or more cooling stages between any two compression stages to cool the compressed fluid exiting one stage before the compressed fluid enters the next stage.

In some embodiments, a pressure of the refinery gas in line 102 and/or a pressure of the pre-treated refinery gas in line 105 can be determined. A compressor stage in the multi-stage compressor 130 can be selected for introducing the refinery gas in line 102 and/or the pre-treated refinery gas in line 105 based, at least in part, on the determined pressure of the refinery gas in line 102 and/or the determined pressure of the pre-treated refinery gas in line 105. The refinery gas in line 102 and/or the pre-treated refinery gas in line 105 can be combined with the process gas just prior to the first stage 131, between the first stage 131 an the second stage 133, between the second stage 133 and a third stage, between any two additional stages, or with the compressed process gas that exits via line 134 from the multi-stage compressor 130.

In another embodiment, the process gas in line 129 can be introduced into the multi-stage compressor 130 and a compressed process gas can be recovered via line 134 therefrom. A pressure, a composition, or a pressure and a composition of the pre-treated refinery gas in line 105 can be determined. A location within the recovery facility 114 can be selected for combining at least a portion of the pre-treated refinery gas in line 105 with the compressed process gas in line 134. In some embodiments, the pre-treated process gas can be combined with the compressed process gas in line 134. In other embodiments, the pre-treated process gas in line 105 can be combined with the compressed process gas between or within any one or more of the separation, compression, and/or contaminant removal stages that can be present in the recovery facility 114 as described in more detail below. In still other embodiments, the pre-treated process as in line 105 can be combined with the process gas in line 129, the compressed process gas in line 132, with the compressed process gas between any additional compression stages, and/or the compressed process gas in line 134.

As shown, the refinery gas via line 102 and/or the pre-treated refinery gas via line 105 can be combined with the compressed process gas in line 132 between the first compression stage 131 and the second compression stage 133 to produce a mixture of the process gas and the refinery gas and/or the pre-treated refinery gas or simply a combined gas in line 132. The combined gas via line 132 can be introduced into the second stage 133 of the multi-stage compressor to produce a compressed combined gas via line 134 that can include the process gas and the refinery gas and/or the pre-treated refinery gas that can be conducted away from the multi-stage compressor 130.

The compressed combined gas via line 134 can be introduced into an amine tower 135 for purification, e.g., by removing hydrogen sulfide and/or other acidic gases. The amine tower can also receive a lean solution of one or more light amines via line 122. At least a portion of any acid gases in the combined gas can be transferred to the lean amine solution to produce a rich amine solution that can be conducted away via line 106. A treated combined gas via line 137 can be introduced into a caustic tower 138 for additional treatment, such as with an aqueous hydroxide solution, e.g., sodium hydroxide, to further reduce the content of any acidic gases in the combined gas. An upgraded combined gas can be conducted away via line 139 from the caustic tower 138.

The upgraded combined gas via line 139 can be introduced into a separation stage 140 that can separate a bottoms stream via line 141 and an overhead stream via line 142. The bottoms stream can include $C_{3+}$ hydrocarbons and the overhead stream can include molecular hydrogen, $C_1$-$C_2$ hydrocarbons, and some $C_{3+}$ hydrocarbons. It should be understood that the invention is not limited to the embodiment illustrated by FIG. 1. As such, this description should not be interpreted as excluding other embodiments within the broad scope of the invention, such as embodiments in which (i) the overhead stream in line 142 includes methane and molecular hydrogen and the bottoms stream in line 141 includes $C_{2+}$ hydrocarbons or (ii) the overhead stream in line 142 includes molecular hydrogen and $C_{3-}$ hydrocarbons and the bottoms stream in line 141 includes $C_{4+}$ hydrocarbons. Accordingly, those skilled in the art will appreciate that various separations and upgrading process configurations can be arranged in many different configurations within the scope of the present invention in addition to the embodiment illustrated by FIG. 1.

The bottoms stream via line 141 can be introduced into a separation stage 113 that can separate a bottoms stream via line 143 and an overhead stream via line 144. The bottoms stream in line 143 can include $C_{4+}$ hydrocarbons and the overhead stream in line 144 can include $C_3$ hydrocarbons. The bottoms stream via line 143 can be introduced into a separation stage 145 that can separate a bottoms stream via line 146 and an overhead stream via line 147. The bottoms stream in line 146 can include $C_{5+}$ hydrocarbons and the overhead stream in line 147 can include $C_4$ hydrocarbons. The bottoms stream via line 146 can be introduced into a gasoline hydrogenation unit 148 to produce various gasoline products that can be recovered via line 149.

The overhead in line 144 that includes the $C_3$ hydrocarbons can be conducted to further processing stages that can include, but are not limited to, (i) a methanol/COS bed 150, then through line 151 to (ii) an arsine bed 152, and then through line 153 to (iii) a methyl acetylene and propadiene (MAPD) converter 154, and then through line 155 to (iv) a $C_3$ separation stage, e.g., a fractionator, 156 for separation of propylene via line 157 and propane via line 158. In some embodiments, the propane in line 158 can be recycled to the steam cracker 116 for cracking, used in a refinery process, e.g., sent to the refinery 101 for processing, and/or recovered as a product.

The overhead via line 142 can be introduced into a compressor 160 for additional compression. The compressor 160 can include a single compression stage or can be a multi-stage compressor that can be the same as or similar to the multi-stage compressor 130. From the compressor 160 a stream via line 161 that includes compressed molecular hydrogen, methane, and $C_2$ hydrocarbons (possibly with some $C_{3+}$ hydrocarbons) can be introduced into a series of purification stages that can include, but are not limited to, (i) a mercaptan and carbonyl sulfide removal bed 162, then through line 163 to (ii) an arsine bed 164, then through line 165 to (iii) a $C_2$ acetylene converter 166. The carbonyl sulfide removal bed 162 can include any suitable sorbent or combination thereof. Suitable sorbents can be or can include, but are not limited to, alkali promoted alumina, e.g., sodium on alumina. A suitable commercially available sorbent can include SELEXSORB® available from BASF and AXSORB® 980/984 available from Axens. A purified stream via line 167 that can include molecular hydrogen, methane, ethane, ethylene, some $C_{3+}$ hydrocarbons, or a mixture thereof can be introduced into a separation stage 168. The separation stage 168 can separate from the purified stream in line 167 at least (i) a first stream via line 169 that can include molecular hydrogen and methane, (ii) a second stream via line 170 that can include $C_2$ hydrocarbons that can be transferred to a separation stage 171. The separator 171 can separate from the second stream (i) any residual $C_{3+}$ hydrocarbons, e.g., for recycle, via line 172 to line 144 that feeds the methanol/COS bed 150 and (ii) a stream via line 173 that includes purified $C\,2$ hydrocarbons.

The carbonyl sulfide removal bed 162 can be periodically regenerated by introducing a regenerating gas via line 159 into the carbonyl sulfide removal bed 162 and contacting the sorbent rich in carbonyl sulfide to produce a regenerated sorbent and a desorb effluent that can include one or more sulfur based contaminants that can be recovered via line 180. The regenerating gas can be or can include, but is not limited to, one or more $C_1$-$C_4$ alkanes. In some embodiments, the regenerating gas in line 159 can be recovered from the combined gas in the recovery facility 114. For example, the regenerating gas can include methane in line 178, ethane in line 176, propane in line 158, and/or butane in line 147 separated from the combined gas. In some embodiments, the regenerating gas can contain ≤5 mol % of any alkenes. In some embodiments, at least a portion of the desorb effluent can be combined with a hydrocarbon feed in line 111 or a heated hydrocarbon feed in line 117 and introduced into the steam cracker 115.

In some embodiments, the compressed combined gas in line 134, the treated combined gas in line 137, and/or the upgraded combined gas in line 139 may include water vapor. At least a portion of the water can be removed by condensing, by sorption, or otherwise removing at least a portion of the water and separating and a dried gas therefrom. In some embodiments, at least a portion of the purified stream in line 167 can be introduced via line 190 into a dehydrator 192 to remove at least a portion of the water vapor to provide a dried stream via line 194 that can be introduced via line 167 into the separation stage 168. The dehydrator 192 can be located at any suitable position within the recovery facilities 114. For example, the overhead stream in line 142 could be introduced into the dehydrator 190 with the dried stream via line 194 being introduced into the carbonyl sulfide removal bed 162. In another example, the upgraded combined gas in line 139 could be introduced into the dehydrator 190 with the dried stream via line 194 being introduced into the separation stage 140. In addition to or in lieu of the dehydrator 190, water can be removed via one or more other ways such as during compression of the overhead in line 142 via the compressor 160.

The stream in line 173 can be introduced into separation stage 174 that can separate therefrom at least (i) ethylene via line 175 and (ii) ethane via line 176. The ethane can be recycled to the steam cracker 116 for cracking, used in a refinery process, e.g., sent to refinery 101 for processing, and/or recovered as a product. Additional separations can optionally be carried out. For example, a separator 177 can be used to separate from the stream in line 169 into (i) methane via line 178 and (ii) molecular hydrogen via line 179. In some embodiments, at least a portion of the separated methane in line 178 can be used as a fuel gas and/or recycled to the steam cracker 116 for the production of synthesis gas and molecular hydrogen. In some embodiments, at least a portion of the molecular hydrogen in line 179 can be recycled to a hydroprocessing stage, e.g., for use in upgrading the gasoline hydrogenation unit 148.

In some embodiments, the refinery gas via line 102 and/or the pre-treated refinery gas via line 105 can be introduced into the recovery facility 114 at one or more locations downstream of the multi-stage compressor 130. For example, the refinery gas via line 102 and/or the pre-treated refinery gas via line 105 can be combined with any one or more of the streams in lines 134, 137, 139, 141, 142, 161, 163, 165, 167, 190, 144, 151, 153, 155, 143, 170, and/or 146. The particular location the refinery gas in line 102 and/or the pre-treated refinery gas in line 105 can be introduced into the recovery facility 114 can depend, at least in part, on the composition and/or on the pressure of the refinery gas in line 102 and/or the pre-treated refinery gas in line 105. In at least some embodiments, the refinery gas in line 102 and/or the pre-treated refinery gas in line 105 can be introduced into one of the plurality of compressor stages in the multi-stage compressor 130, the separation stage 156, and/or the separation stage 145.

Figure 2:
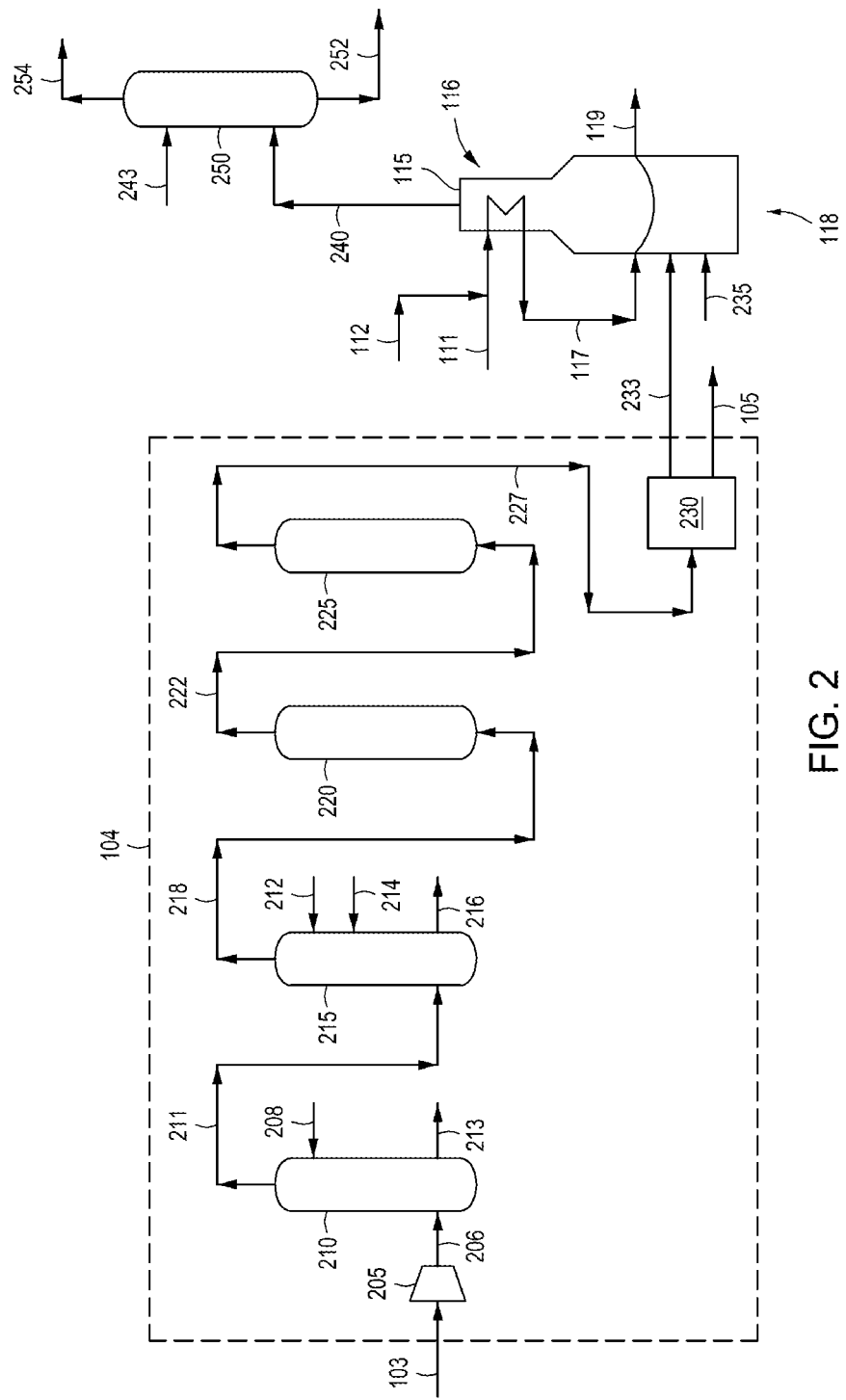
FIG. 2 depicts a schematic of an illustrative pre-treatment stage for pre-treating a refinery gas and recovering a fuel gas and a pre-treated refinery gas therefrom, according to one or more embodiments described.

FIG. 2 depicts a schematic of an illustrative pre-treatment stage 104 for pre-treating the refinery gas in line 103 and recovering a fuel gas via line 233 and a pre-treated refinery gas via line 105 therefrom, according to one or more embodiments. In some embodiments, the refinery gas in line 103 can include molecular hydrogen, methane, $C_{2+}$ alkanes, and one or more impurities, e.g., ammonia, water, and/or mercury. In some embodiments, the pre-treatment stage 104 can include, but is not limited to, a compressor 205, a water wash tower 210, a caustic tower 215, a dehydrator 220, a mercury removal stage 225, and a separation stage 230. In some embodiments, the pre-treatment stage 104 can also include an optional amine tower, e.g., between the water wash tower 210 and the caustic tower 215. It should be understood that the any one or more of the compressor 205, the water wash tower 210, the caustic tower 215, the dehydrator 220, the mercury removal stage 225, and the separation stage 230 are optional and can be used or absent depending, at least in part, on the composition of the refinery gas in line 103.

The refinery gas via line 103 can be introduced into the compressor to produce a compressed refinery gas via line 206. The compressed refinery gas via line 206 and a wash water via line 208 can be introduced into the water wash tower 210 and contacted therein. An overhead via line 211 and a wastewater via line 213 can be conducted away from the water wash tower 210. The water wash tower can reduce a concentration of ammonia in the refinery gas if the refinery gas contains an undesirable amount of ammonia. The overhead via line 211, a wash water via line 212, and a caustic solution via line 214 can be introduced into the caustic tower 215 and contacted therein. The caustic solution can be an aqueous hydroxide solution, e.g., sodium hydroxide, that can reduce the content of any acidic gases in the overhead stream introduced via line 211. A spent caustic via line 216 and an overhead via line 218 can be conducted away from the caustic tower 215.

The overhead via line 218 can be introduced into the dehydrator 220 to remove at least a portion of any water vapor therefrom. A dried overhead via line 222 can be conducted from the dehydrator 220 to the mercury removal stage 225. The mercury removal stage 225 can remove at least a portion of any mercury or compounds thereof that can be present in the refinery gas in line 103. A mercury-lean overhead can be conducted via line 227 from the mercury removal stage 225 to the separation stage 230. It should be understood that, while the dehydrator 220 and the mercury removal stage 225 are shown as being separate vessels, the dehydrator 220 and the mercury removal stage 225 can be in a single vessel.

In some embodiments, the separation stage 230 can include, but is not limited to, a cold box and a demethanizer. As such, fuel gas stream via line 233 and the pre-treated refinery gas that includes $C_{2+}$ hydrocarbons via line 105 can be conducted away from the separation stage 230. In some embodiments, at least a portion of the fuel gas in line 233 and an oxidant, e.g., air, via line 235 can be introduced into the steam cracker 115 and combusted therein to produce at least a portion of the heat needed to drive the steam cracking reactions within a radiant section 118 of the steam cracker 115. In other embodiments, at least a portion of the fuel gas in line 233 and the oxidant in line 235 can be introduced into the steam cracker 115, one or more boilers, one or more furnaces, one or more other combustion devices, or any combination thereof and combusted therein to produce heat for use to heat the boiler, the furnace, and/or the other combustion device(s). The pre-treated refinery gas via line 105 can be combined with the process gas produced in the steam cracker 115 as described above.

In some embodiments, the combustion or flue gas via line 240 and a lean amine solution via line 243 can be introduced into an amine tower 250 and contacted therein. A rich-amine solution via line 252 and an overhead lean in acidic gases via line 254 can be conducted away from the amine tower 250. In some embodiments, the overhead via line 254 can be vented to the atmosphere or otherwise disposed.

In an alternative embodiment, the separation stage 230, rather than including the cold box and demethanizer, can include an absorption based demethanizer. By including an absorption based demethanizer the process can be operated at a greater temperature. By operating at a greater temperature the caustic tower 215, the dehydrator 220, and the mercury removal stage 225 can be removed, which can eliminate the costs associated with those devices. Accordingly, in this alternative embodiment that employs an absorption based demethanizer 230, the pre-treatment stage 104 can include, but is not limited to, the compressor 205, the water wash tower 210, and the separation stage 230 that includes an absorption based demethanizer.

Figure 3:
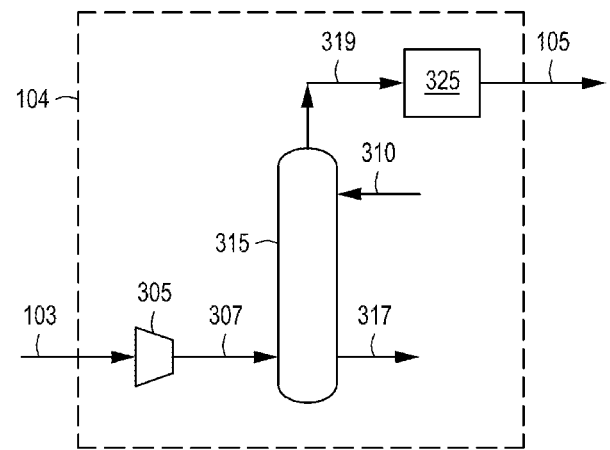
FIG. 3 depicts a schematic of another illustrative pre-treatment stage for pre-treating a refinery gas to remove at least a portion of any nitrogen oxide and/or at least a portion of any molecular oxygen, according to one or more embodiments described.

FIG. 3 depicts a schematic of another illustrative pre-treatment stage 104 for pre-treating the refinery gas in line 103 to remove at least a portion of any nitrogen oxide and/or at least a portion of any molecular oxygen, according to one or more embodiments. The refinery gas via line 103 can be introduced into a compressor 305 to produce a compressed refinery gas via line 307. The compressed refinery gas via line 307 and a lean amine solution via line 310 can be introduced into an amine tower 315 and contacted therein. A rich-amine solution via line 317 and an overhead lean in acidic gases via line 319 can be conducted away from the amine tower 315. The overhead via line 319 can be introduced into a DeOx reactor 325 to remove at least a portion of any oxygen, at least a portion of any nitrogen oxides, at least a portion of any acetylene, at least a portion of any mercury, at least a portion of any carbonyl sulfide, and/or at least a portion of any arsine that can be present in the refinery gas in line 103. The DeOx reactor 325 can include one or more catalysts that can contact the refinery gas in the presence of molecular hydrogen under conditions sufficient to convert at least a portion of any nitrogen oxides to ammonia and/or to convert at least a portion of any molecular oxygen to water. In some embodiments, the catalyst can be or can include, but is not limited to, nickel-based sulfided catalysts, copper-based catalysts, and the like. The pre-treated refinery gas via line 105 can be recovered from the DeOx reactor 325 and combined with the process gas produced in the steam cracker 115 as described above.

In an alternative embodiment, the pre-treatment stage 104 can include the compressor 305 and the DeOx reactor 325, or the amine tower 315 and the DeOx reactor 325, or only the DeOx reactor 325. The use of the compressor 305 and the amine tower 315, in some cases, can be optional and can depend, at least in part, on the pressure of the refinery gas in line 103 and the amount of ammonia present in the refinery gas in line 103.

Figure 4:
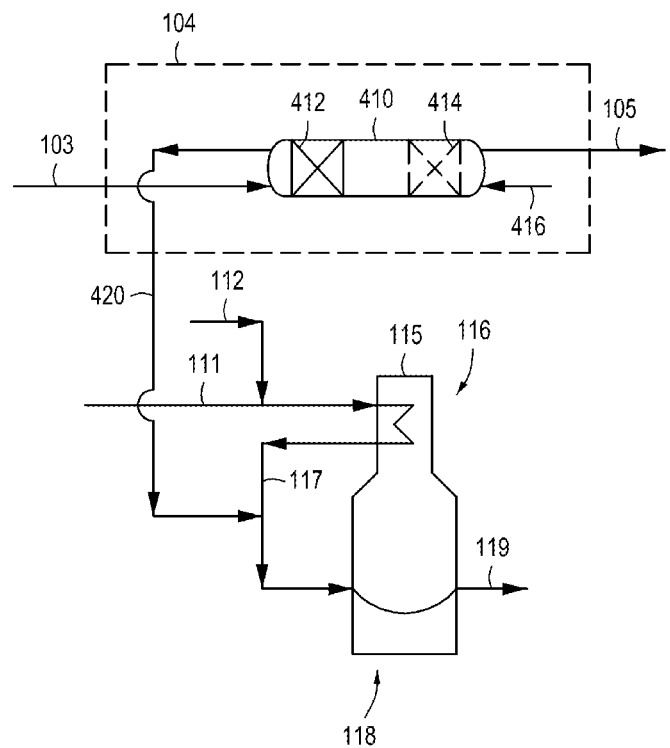
FIG. 4 depicts another illustrative pre-treatment stage for pre-treating a refinery gas by removing at least a portion of any carbonyl sulfide therefrom, according to one or more embodiments described.

FIG. 4 depicts another illustrative pre-treatment stage 104 for pre-treating the refinery gas in line 103 by removing at least a portion of any carbonyl sulfide therefrom, according to one or more embodiments. The refinery gas via line 103 can be introduced into carbonyl sulfide removal stage 410 and contacted with a sorbent 412 to cause at least a portion of any carbonyl sulfide to sorb onto the sorbent to produce a pre-treated refinery gas lean in carbonyl sulfide and a sorbent rich in carbonyl sulfide. Suitable sorbents 412 can be or can include, but are not limited to, commercially available sorbents such as SELEXSORB® available from BASF and AXSORB® 980/984 available from Axens. The pre-treated refinery gas via line 105 can be recovered from the carbonyl sulfide removal stage 410 and combined with the process gas produced in the steam cracker 115 as described above.

In some embodiments, the carbonyl sulfide removal stage 410 can include the sorbent or first sorbent 412 and an optional second sorbent 414. The second sorbent 414 can remove at least a portion of any mercaptan contained in the refinery gas line 103. The refinery gas lean in carbonyl sulfide can be contacted with the second sorbent 414 to produce the pre-treated refinery gas via line 105. Suitable sorbents 414 can be or can include, but are not limited to, one or more zeolites, e.g., 13X zeolite based material. Suitable commercially available sorbents can include SELEXSORB® CD available from BASF and AXSORB® 902 available from Axens. In some embodiments, the refinery gas in line 103 can be contacted with the second sorbent 414 followed by the first sorbent 412 or substantially simultaneously with the first sorbent 412 and the second sorbent 414.

In other embodiments, the pretreatment stage 104 shown in FIG. 4 can include an amine wash tower, a caustic wash tower, or both an amine wash tower and a caustic wash tower in addition to or in lieu of the optional second sorbent 414. In this embodiment, the refinery gas via line 103 can be introduced into the amine wash tower, the caustic wash tower, the amine wash tower and then into the caustic wash tower, or the caustic wash tower and then into the amine wash tower to produce an intermediate-treated refinery gas that can have a reduced concentration of hydrogen sulfide and/or other acidic gases as compared to the refinery gas in line 103. The intermediate-treated refinery gas can then be introduced into the carbonyl sulfide removal stage 410 and contacted with the first sorbent 412 to produce the pre-treated refinery gas in line 105.

The sorbent 412 and, if present, the second sorbent 414 can be regenerated periodically by contacting the sorbent with a regeneration gas introduced via line 416 into the carbonyl sulfide removal stage 410 to produce a regenerated sorbent 412 and, if present, a regenerated second sorbent 414 and a desorb effluent via line 420. The regenerating gas in line 416 can be or can include, but is not limited to, hydrogen, methane, ethane, propane, butane, or a mixture thereof. In some embodiments, the regeneration gas in line 416 can be separated from the combined gas or the upgraded combined gas recovered from the recovery facility 114 in the steam cracker facility 110. In some embodiments, at least a portion of the desorb effluent via line 420 can be introduced into a pyrolysis zone of the steam cracker 115 to produce a steam cracker effluent. In some embodiments, during introduction of the desorb effluent via line 420 into the pyrolysis zone of the steam cracker 115, at least a portion of the steam cracker effluent in line 119 (FIG. 1) can include sulfur obtained from the desorb effluent at least partly as hydrogen sulfide.

Production of the Process Gas

Returning to FIG. 1, the hydrocarbon feed in line 111 can be mixed, blended, combined, or otherwise contacted with water and/or steam in line 112 and heated in a convection section 116 of the steam cracker 115 to produce a heated mixture in line 117. The heated mixture can be subjected to steam cracking conditions in a radiant section 118 of the steam cracker 115 to produce a steam cracker effluent via line 119. In some embodiments, when a sufficiently heavy hydrocarbon feed is present in line 111, a vapor phase product and a liquid phase product can be separated from the heated mixture in line 117 before subjecting the heated mixture to steam cracking by introducing the heated mixture into one or more separation stages. The vapor phase product can be heated to a temperature of $\geq 400°$ C., e.g., a temperature of about 425° C. to about 825° C., and subjected to steam cracking conditions to produce the steam cracker effluent in line 119. The liquid phase product can be subjected to one or more additional upgrading processes well-known in the art. In some examples, the optional hydrocarbon feed separation stage and upgrading of the liquid phase product can be or include those disclosed in U.S. Pat. Nos. 7,138,047; 7,090,765; 7,097,758; 7,820,035; 7,311,746; 7,220,887; 7,244,871; 7,247,765; 7,351,872; 7,297,833; 7,488,459; 7,312,371; 6,632,351; 7,578,929; 7,235,705; and 8,158,840.

Hydrocarbon feeds that can be introduced into the steam cracker via line 111 can be or can include, but are not limited to, raw crude oil, desalted crude oil, gas oils, heating oil, jet fuel, diesel, kerosene, gasoline, coker naphtha, steam cracked naphtha, catalytically cracked naphtha, hydrocrackate, reformate, raffinate reformate, Fischer-Tropsch liquids, Fischer-Tropsch gases, natural gasoline, distillate, virgin naphtha, atmospheric pipestill bottoms, vacuum pipestill streams such as vacuum pipestill bottoms and wide boiling range vacuum pipestill naphtha to gas oil condensates, heavy non-virgin hydrocarbons from refineries, vacuum gas oils, heavy gas oil, naphtha contaminated with crude, atmospheric residue, heavy residue, a C4/residue admixture, naphtha/residue admixture, hydrocarbon gases/residue admixture, hydrogen/residue admixtures, waxy residues, gas oil/residue admixture, relatively light alkanes, e.g., ethane, propane, butane, pentane, or a mixture thereof, fractions thereof, or any mixture thereof. In at least some embodiments, the hydrocarbon feed can be or can include, but is not limited to, naphtha, gas oil, vacuum gas oil, a waxy residue, an atmospheric residue, a crude oil, a fraction thereof, or a mixture thereof. In some embodiments, if a raw crude oil or other hydrocarbon that includes salts will be steam cracked, the raw crude oil or other hydrocarbon can optionally be subjected to pretreatment, e.g., desalting, to remove at least a portion of any salts contained in the raw crude oil or other hydrocarbon before heating the hydrocarbon feed to produce the heated mixture. In some embodiments, the hydrocarbon feed can be primarily composed of relatively light hydrocarbons such as $C_2$ to $C_8$ alkanes. Suitable hydrocarbon feeds can also be or include the hydrocarbons or hydrocarbon feeds disclosed in U.S. Pat. Nos. 7,993,435; 8,277,639; 8,696,888; 9,327,260; 9,637,694; 9,657,239; and 9,777,227; and International Patent Application Publication No. WO 2018/111574.

The steam cracking conditions can include, but are not limited to, one or more of: exposing the hydrocarbon feed to a temperature (as measured at a radiant outlet of a steam cracking apparatus) of ≥400° C., e.g., a temperature of about 700° C., about 800° C., or about 900° C. to about 950° C., about 1,000° C., or about 1050° C., a pressure of about 0.1 bar to about 5 bars (absolute), and/or a steam cracking residence time of about 0.01 seconds to about 5 seconds. In some examples, the hydrocarbon feed can be steam cracked according to the processes and systems disclosed in U.S. Pat. Nos. 6,419,885; 7,993,435; 9,637,694; and 9,777,227; U.S. Patent Application Publication No. 2018/0170832; and International Patent Application Publication No. WO 2018/111574. The steam cracker effluent in line 119 can be at a temperature of ≥300° C., ≥400° C., ≥500° C., ≥600° C., or ≥700° C., or ≥800° C., or more. The steam cracker effluent in line 119 can be cooled to produce a cooled steam cracker effluent.

As shown, the cooled steam cracker effluent via line 121 can be introduced into a primary fractionator 123. The cooled stream cracker effluent can be separated within the primary fractionator to provide a bottoms or tar product via line 124, the steam cracker quench oil via line 125, the steam cracker gas oil via line 126, and an overhead product that includes a steam cracker naphtha and a process gas via line 127. In some embodiments, the cooled steam cracker effluent via line 121 can be introduced into one or more separation stages, e.g., a tar knock out drum, to separate a tar product and a light product therefrom, with the light product then being introduced into the primary fractionator. Suitable separation stages can include those disclosed in U.S. Pat. Nos. 7,674,366; 7,718,049; 8,083,931; 8,092,671; 8,105,479.

The overhead product via line 127 can be introduced into a quench tower 128 along with quench water, e.g., a recycled quench water, via line 107 to cool the overhead product. A process gas that can include ethylene, propylene, or ethylene and propylene can be recovered via line 129 and a mixture that includes steam cracker naphtha and quench water via line 109 can be conducted away from the quench tower 128. It should be understood that, while shown as being separate vessels, the quench tower 128 can be integrated with the primary fractionator 123.

The mixture of steam cracker naphtha and quench water in line 109 can be introduced into one or more separators 108. The steam cracker naphtha via line 181, quench water via line 183, and recycle quench water via line 107 can be conducted away from the separator 108. The quench water via line 183 can be removed from the system, e.g., introduced into a wastewater treatment process, sent a sour water stripper, dilution steam generation system, etc. The recycle quench water via line 107 can be recycled to the quench tower 128. In some examples, the recycle quench water via line 107 can be cooled, e.g., by air and/or water, and recycled to the quench tower 128. In some examples, the recycle quench water via line 107 can be recycled to the quench tower 128 as a single return and/or split into multiple returns to the quench tower 128 and/or other process equipment.

A portion of the steam cracker naphtha via lines 181 and 185 can be removed and further processed. A portion of the steam cracker naphtha via lines 181 and 136 can be recycled to the top fractionation section as a reflux. The steam cracker naphtha in line 185 can have a final boiling point of ≤260° C., as measured according to ASTM D2887-18. In some examples, the steam cracker naphtha can have a final boiling point of about 220° C., about 221° C., about 225° C., or about 230° C. to about 235° C., about 240° C., about 245° C., about 250° C., or about 255° C. In some examples, the amount of steam cracker gas oil via line 126 conducted away from the primary fractionator 123 can be controlled or adjusted to maintain recovery of a steam cracker naphtha in line 185 that has a final boiling point of ≤260° C., as measured according to ASTM D2887-18. The amount of steam cracker naphtha recycled via lines 181 and 136 relative to the cooled steam cracker effluent introduced via line 121 into the primary fractionator 123 can be adjusted or controlled to provide a desired temperature and/or liquid loading within the top fractionation section of the primary fractionator 123.

Steam crackers, primary fractionators, other equipment, and process conditions are well-known. Suitable steam crackers, primary fractionators, process gas recovery configurations, other equipment, and process conditions can include those disclosed in U.S. Pat. Nos. 6,419,885; 7,560,019; 7,993,435; 8,105,479; 8,197,668; 8,882,991; 8,894,844; 9,637,694; 9,777,227; U.S. Patent Application Publication Nos.: 2014/0061096; 2014/0357923; 2016/0376511; 2018/0170832; 2019/0016975; and WO Publication No.: WO 2018/111574.

Listing of Embodiments

This disclosure may further include the following non-limiting embodiments.

1. A process for removing contaminants from a refinery gas, comprising: recovering a process gas comprising ethylene and propylene from a steam cracker effluent recovered from a stream cracker in a steam cracker facility; recovering a refinery gas from a refinery facility; compressing the process gas in a plurality of compressor stages; determining a pressure of the refinery gas; selecting a compressor stage in the plurality of compressor stages for introducing the refinery gas using the determined pressure of the refinery gas; introducing the refinery gas into the selected compressor stage to produce a combined gas comprising the process gas and the refinery gas; and removing at least a portion of one or more impurities from the combined gas in the steam cracker facility to produce an upgraded combined gas lean in the one or more impurities.

2. The process of paragraph 1, wherein the one or more impurities comprise at least one of ammonia, methanol, methyl mercaptan, ethyl mercaptan, hydrogen sulfide, carbon dioxide, and acetaldehyde, and wherein removing the at least a portion of the one or more impurities from the combined gas comprises contacting the combined gas with an aqueous amine, an aqueous inorganic base, or a combination thereof to produce a spent aqueous amine, a spent caustic, or a combination thereof and a combined gas lean in the one or more impurities.

3. The process of paragraph 1 or 2, wherein the one or more impurities comprise carbonyl sulfide, and wherein removing the at least a portion of the one or more impurities from the combined gas comprises contacting the combined gas with a sorbent under conditions sufficient to cause at least a portion of the carbonyl sulfide to sorb onto the sorbent to produce a treated combined gas lean in carbonyl sulfide and a sorbent rich in carbonyl sulfide.

4. The process of paragraph 3, further comprising: contacting the sorbent rich in carbonyl sulfide with a regenerating gas comprising molecular hydrogen, one or more $C_1$-$C_4$ hydrocarbons, or a mixture thereof to produce a regenerated sorbent and a desorb effluent comprising a sulfur-based contaminant; and introducing at least a portion of the desorb effluent into a pyrolysis zone in the steam cracker.

5. The process of paragraph 3 or 4, wherein the regenerating gas comprises one or more $C_1$-$C_4$ alkanes, wherein the regenerating gas comprises ≤5 mol % of any alkenes, and wherein the regenerating gas is recovered from the upgraded combined gas.

6. The process of any of paragraphs 1 to 5, wherein the combined gas comprises water vapor, and wherein removing the at least a portion of the one or more impurities from the combined gas comprises removing at least a portion of the water vapor to produce a dried combined gas.

7. The process of any of paragraphs 1 to 6, wherein the refinery gas is recovered from an upgrading process comprising at least one of: fluid catalytic cracking, coking, hydrocracking, hydrotreating, isomerization, reforming, decoking, hydrocarbon combustion, and hydrocarbon distillation.

8. The process of any of paragraphs 1 to 7, further comprising: recovering an alkane feed comprising at least one of ethane and propane from the upgraded combined gas; and introducing at least a portion of the alkane feed to a pyrolysis zone in the steam cracker.

9. The process of any of paragraphs 1 to 8, further comprising pre-treating the refinery gas to remove at least a portion of one or more impurities comprising at least one of: molecular nitrogen, a nitrogen oxide, and molecular oxygen to produce a pre-treated refinery gas, wherein the pre-treated refinery gas is introduced into the selected compressor stage to produce the combined gas.

10. A process for removing contaminants from a refinery gas, comprising: recovering a refinery gas from a refinery facility; pre-treating the refinery gas to remove at least a portion of one or more first impurities comprising at least one of: molecular nitrogen, a nitrogen oxide, and molecular oxygen to produce a pre-treated refinery gas; recovering a process gas comprising ethylene and propylene from a steam cracker effluent in a steam cracker facility; compressing the process gas in a plurality of compressor stages to produce a compressed process gas; determining a pressure, a composition, or a pressure and a composition of the pre-treated refinery gas; selecting a location in the steam cracker facility for combining at least a portion of the pre-treated refinery gas with the compressed process gas using the pressure, the composition, or the pressure and the composition of the pre-treated refinery gas; adding at least a portion of the pre-treated refinery gas to the process gas at the selected location to produce a combined gas comprising the process gas and the refinery gas; and removing at least a portion of one or more second impurities from the combined gas in the steam cracker facility to produce an upgraded combined gas lean in the one or more second impurities.

11. The process of paragraph 10, further comprising recovering a tail gas and a $C_{2+}$ gas from the pre-treated refinery gas, wherein the tail gas comprises at least one of molecular hydrogen and methane, and wherein the $C_{2+}$ gas is added to the process gas at the selected location.

12. The process of paragraph 11, further comprising: introducing at least a portion of the tail gas and an oxidant into a combustor in a steam cracker located in the steam cracker facility; combusting the tail gas to produce heat and a combustion effluent; and transferring at least a portion of the heat to a radiant section of the steam cracker.

13. The process paragraph 12, further comprising contacting the combustion effluent with an aqueous inorganic base to produce an exhaust effluent lean in sulfur-based contaminants and a spent aqueous inorganic base.

14. The process of any of paragraphs 10 to 13, wherein the one or more first impurities further comprises at least one of ammonia, water, and mercury, and wherein pre-treating the refinery gas further comprises removing at least a portion any ammonia, at least a portion of any water, and at least a portion of any mercury therefrom to produce the pre-treated refinery gas.

15. The process of any of paragraphs 10 to 14, wherein the selected location in the steam cracker facility comprises one of the plurality of compressor stages, a deethanizer, a depropanizer, or a debutanizer.

16. The process of any of paragraphs 10 to 15, wherein the refinery gas comprises at least one of the nitrogen oxide and the molecular oxygen, and wherein pre-treating the refinery gas comprises contacting the refinery gas with a catalyst in the presence of molecular hydrogen under conditions sufficient to convert at least a portion of any nitrogen oxide to ammonia and to convert at least a portion of any molecular oxygen to water.

17. The process of any of paragraphs 10 to 16, wherein the one or more second impurities comprises at least one of ammonia, arsine, carbon monoxide, methane, methanol, carbonyl sulfide, methyl mercaptan, ethyl mercaptan, hydrogen sulfide, carbon dioxide, acetaldehyde, water, mercury, silicon, carbon disulfide, one or more thiophenes, and acetylene.

18. The process of any of paragraphs 10 to 17, wherein the refinery gas is recovered from an upgrading process comprising at least one of: fluid catalytic cracking, coking, hydrocracking, hydrotreating, isomerization, reforming, decoking, hydrocarbon combustion, and hydrocarbon distillation.

19. A process for removing contaminants from a refinery gas, comprising: recovering a refinery gas comprising one or more $C_1$-$C_5$ hydrocarbons and carbonyl sulfide from a refinery facility; contacting the refinery gas with a sorbent under conditions sufficient to cause at least a portion of the carbonyl sulfide to sorb onto the sorbent to produce a pre-treated refinery gas lean in carbonyl sulfide and a sorbent rich in carbonyl sulfide; contacting the sorbent rich in carbonyl sulfide with a regenerating gas to produce a regenerated sorbent and a desorb effluent comprising a sulfur-based contaminant; introducing at least a portion of the desorb effluent into a pyrolysis zone of a steam cracker in a steam cracker facility to produce a steam cracker effluent; recovering a process gas comprising one or more $C_1$-$C_4$ hydrocarbons from the steam cracker effluent; compressing the process gas in a plurality of compressor stages to produce a compressed process gas; combining the pre-treated refinery gas and the compressed process gas to produce a combined gas comprising the pre-treated refinery gas and the process gas; and removing one or more impurities from the combined gas in the steam cracker facility to produce an upgraded combined gas lean in the one or more impurities. In some embodiments, the pressure of the refinery gas can be determined and one or more suitable locations within the recovery facility can be determined for introducing the refinery gas. For example, the pressure of the process gas or a gas stream separated therefrom can be sufficient to allow the refinery gas to be introduced and combined therewith.

20. The process of paragraph 19, wherein the regenerating gas comprises at least one of: hydrogen, methane, ethane, propane, and butane separated from the combined gas.

21. The process of paragraph 19 or 20, wherein, during the introduction of the desorb effluent into the pyrolysis zone, the steam cracker effluent comprises sulfur obtained from the desorb effluent at least partly as hydrogen sulfide.

22. The process of any of paragraphs 19 to 21, wherein removing the one or more impurities from the combined gas comprises contacting the combined gas with an aqueous amine, an aqueous inorganic base, or a combination thereof to produce a spent aqueous amine, a spent caustic, or a combination thereof and the upgraded combined gas.

23. The process of any of paragraphs 19 to 22, wherein the refinery gas is recovered from an upgrading process comprising at least one of: fluid catalytic cracking, coking, hydrocracking, hydrotreating, isomerization, reforming, decoking, hydrocarbon combustion, and hydrocarbon distillation.

24. The process of any of paragraphs 19 to 23, further comprising removing one or more acid gas from the refinery gas or the pre-treated refinery gas to produce a refinery gas or a pre-treated refinery gas lean in one or more acid gases.

25. The process of any of paragraphs 19 to 23, wherein the sorbent is a first sorbent, wherein the refinery gas further comprises a mercaptan, the process further comprising contacting the refinery gas with a second sorbent under conditions sufficient to cause at least a portion of the mercaptan to sorb onto the second sorbent to produce a pre-treated refinery gas lean in carbonyl sulfide and the mercaptan and a first sorbent rich in carbonyl sulfide and a second sorbent rich in the mercaptan.

26. The process of paragraph 25, wherein the refinery gas is contacted first with the first sorbent first and the second sorbent second, the second sorbent first and the first sorbent second, or substantially simultaneously with the first and second sorbents.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A process for removing contaminants from a refinery gas, comprising:
    recovering a process gas comprising ethylene and propylene from a steam cracker effluent recovered from a stream cracker in a steam cracker facility;
    recovering a refinery gas from a refinery facility;
    compressing the process gas in a plurality of compressor stages;
    determining a pressure of the refinery gas;
    selecting a compressor stage in the plurality of compressor stages for introducing the refinery gas using the determined pressure of the refinery gas, wherein the selected compressor stage is located after a first compressor stage and before a last compressor stage of the plurality of compressor stages;
    introducing the refinery gas into the selected compressor stage to produce a combined gas comprising the process gas and the refinery gas; and
    removing at least a portion of one or more impurities from the combined gas in the steam cracker facility to produce an upgraded combined gas lean in the one or more impurities.

2. The process of claim 1, wherein the one or more impurities comprise at least one of: ammonia, methanol, methyl mercaptan, ethyl mercaptan, hydrogen sulfide, carbon dioxide, and acetaldehyde, and wherein removing the at least a portion of the one or more impurities from the combined gas comprises contacting the combined gas with an aqueous amine, an aqueous inorganic base, or a combination thereof to produce a spent aqueous amine, a spent caustic, or a combination thereof and a combined gas lean in the one or more impurities.

3. The process of claim 1, wherein the one or more impurities comprise carbonyl sulfide, and wherein removing the at least a portion of the one or more impurities from the combined gas comprises contacting the combined gas with a sorbent under conditions sufficient to cause at least a portion of the carbonyl sulfide to sorb onto the sorbent to produce a treated combined gas lean in carbonyl sulfide and a sorbent rich in carbonyl sulfide.

4. The process of claim 3, further comprising:
    contacting the sorbent rich in carbonyl sulfide with a regenerating gas comprising molecular hydrogen, one or more $C_1$-$C_4$ hydrocarbons, or a mixture thereof to produce a regenerated sorbent and a desorb effluent comprising a sulfur-based contaminant; and
    introducing at least a portion of the desorb effluent into a pyrolysis zone in the steam cracker.

5. The process of claim 4, wherein the regenerating gas comprises one or more $C_1$-$C_4$ alkanes, wherein the regenerating gas comprises <5 mol % of any alkenes, and wherein the regenerating gas is recovered from the upgraded combined gas.

6. The process of claim 1, wherein the combined gas comprises water vapor, and wherein removing the at least a portion of the one or more impurities from the combined gas comprises removing at least a portion of the water vapor to produce a dried combined gas.

7. The process of claim 1, wherein the refinery gas is recovered from an upgrading process comprising at least one of: fluid catalytic cracking, coking, hydrocracking, hydrotreating, isomerization, reforming, decoking, hydrocarbon combustion, and hydrocarbon distillation.

8. The process of claim 1, further comprising:
    recovering an alkane feed comprising at least one of ethane and propane from the upgraded combined gas; and
    introducing at least a portion of the alkane feed to a pyrolysis zone in the steam cracker.

9. The process of claim 1, further comprising pre-treating the refinery gas to remove at least a portion of one or more impurities comprising at least one of: molecular nitrogen, a nitrogen oxide, and molecular oxygen to produce a pre-treated refinery gas, wherein the pre-treated refinery gas is introduced into the selected compressor stage to produce the combined gas.

10. A process for removing contaminants from a refinery gas, comprising:
recovering a refinery gas from a refinery facility;
pre-treating the refinery gas to remove at least a portion of one or more first impurities comprising at least one of: molecular nitrogen, a nitrogen oxide, and molecular oxygen to produce a pre-treated refinery gas;
recovering a process gas comprising ethylene and propylene from a steam cracker effluent in a steam cracker facility;
compressing the process gas in a plurality of compressor stages to produce a compressed process gas;
determining a pressure, a composition, or a pressure and a composition of the pre-treated refinery gas;
selecting a location in the steam cracker facility for combining at least a portion of the pre-treated refinery gas with the compressed process gas using the pressure, the composition, or the pressure and the composition of the pre-treated refinery gas, wherein the selected location is a compressor stage in the plurality of compressor stages located after a first compressor stage and before a last compressor stage of the plurality of compressor stages;
adding at least a portion of the pre-treated refinery gas to the process gas at the selected location to produce a combined gas comprising the process gas and the refinery gas; and
removing at least a portion of one or more second impurities from the combined gas in the steam cracker facility to produce an upgraded combined gas lean in the one or more second impurities.

11. The process of claim 10, further comprising recovering a tail gas and a $C_{2+}$ gas from the pre-treated refinery gas, wherein the tail gas comprises at least one of molecular hydrogen and methane, and wherein the $C_{2+}$ gas is added to the process gas at the selected location.

12. The process of claim 11, further comprising:
introducing at least a portion of the tail gas and an oxidant into a combustor in a steam cracker located in the steam cracker facility;
combusting the tail gas to produce heat and a combustion effluent; and
transferring at least a portion of the heat to a radiant section of the steam cracker.

13. The process of claim 10, wherein the one or more first impurities further comprises at least one of: ammonia, water, and mercury, and wherein pre-treating the refinery gas further comprises removing at least a portion any ammonia, at least a portion of any water, and at least a portion of any mercury therefrom to produce the pre-treated refinery gas.

14. The process of claim 10, wherein the refinery gas comprises at least one of the nitrogen oxide and the molecular oxygen, and wherein pre-treating the refinery gas comprises contacting the refinery gas with a catalyst in the presence of molecular hydrogen under conditions sufficient to convert at least a portion of any nitrogen oxide to ammonia and to convert at least a portion of any molecular oxygen to water.

15. The process of claim 10, wherein the refinery gas is recovered from an upgrading process comprising at least one of: fluid catalytic cracking, coking, hydrocracking, hydrotreating, isomerization, reforming, decoking, hydrocarbon combustion, and hydrocarbon distillation.

16. A process for removing contaminants from a refinery gas, comprising:
recovering a refinery gas comprising one or more $C_1$-$C_5$ hydrocarbons and carbonyl sulfide from a refinery facility;
contacting the refinery gas with a sorbent under conditions sufficient to cause at least a portion of the carbonyl sulfide to sorb onto the sorbent to produce a pre-treated refinery gas lean in carbonyl sulfide and a sorbent rich in carbonyl sulfide;
contacting the sorbent rich in carbonyl sulfide with a regenerating gas to produce a regenerated sorbent and a desorb effluent comprising a sulfur-based contaminant;
introducing at least a portion of the desorb effluent into a pyrolysis zone of a steam cracker in a steam cracker facility to produce a steam cracker effluent;
recovering a process gas comprising one or more $C_1$-$C_4$ hydrocarbons from the steam cracker effluent;
compressing the process gas in a plurality of compressor stages to produce a compressed process gas;
combining the pre-treated refinery gas and the process gas to produce a combined gas comprising the pre-treated refinery gas and the process gas; and
removing one or more impurities from the combined gas in the steam cracker facility to produce an upgraded combined gas lean in the one or more impurities.

17. The process of claim 16, wherein the regenerating gas comprises at least one of: hydrogen, methane, ethane, propane, and butane separated from the combined gas.

18. The process of claim 16, wherein, during the introduction of the desorb effluent into the pyrolysis zone, the steam cracker effluent comprises sulfur obtained from the desorb effluent at least partly as hydrogen sulfide.

19. The process of claim 16, wherein removing the one or more impurities from the combined gas comprises contacting the combined gas with an aqueous amine, an aqueous inorganic base, or a combination thereof to produce a spent aqueous amine, a spent caustic, or a combination thereof and the upgraded combined gas.

20. The process of claim 16, wherein the refinery gas is recovered from an upgrading process comprising at least one of: fluid catalytic cracking, coking, hydrocracking, hydrotreating, isomerization, reforming, decoking, hydrocarbon combustion, and hydrocarbon distillation.

21. The process of claim 16, further comprising removing one or more acid gases from the refinery gas or the pre-treated refinery gas to produce a refinery gas or a pre-treated refinery gas lean in the one or more acid gases.

22. The process of claim 21, wherein the refinery gas further comprises a mercaptan, and wherein the sorbent is a first sorbent, the process further comprising:
contacting the refinery gas with a second sorbent under conditions sufficient to cause at least a portion of the mercaptan to sorb onto the second sorbent to produce the pre-treated refinery gas and a second sorbent rich in the mercaptan; and
contacting the second sorbent rich in the mercaptan with the regenerating gas to produce a regenerated second sorbent and the desorb effluent, wherein the refinery gas is contacted with the first sorbent first and the second sorbent second, the second sorbent first and the first sorbent second, or substantially simultaneously with the first and second sorbents.

23. The process of claim 1, wherein the refinery gas comprises one or more $C_1$-$C_5$ alkanes, and wherein the refinery gas comprising the one or more $C_1$-$C_5$ alkanes is introduced into the selected compressor stage to produce the combined gas.

24. The process of claim 10, wherein the refinery gas comprises one or more $C_1$-$C_5$ alkanes, and wherein the refinery gas comprising the one or more $C_1$-$C_5$ alkanes is introduced into the selected compressor stage to produce the combined gas.

25. The process of claim 16, further comprising:
determining a pressure of the refinery gas;
selecting a compressor stage in the plurality of compressor stages for introducing the refinery gas using the determined pressure of the refinery gas, wherein the selected compressor stage is located after a first compressor stage and before a last compressor stage of the plurality of compressor stages; and
introducing the refinery gas into the selected compressor stage to produce the combined gas comprising the pre-treated refinery gas and the process gas.

\* \* \* \* \*